E. H. COVELL.

Apparatus for Charging Air or Gas with Hydro-Carbon Vapors.

No. 5,465. Reissued June 24, 1873.

Witnesses.
Jas. M. Hicks
John T. Garvey

Inventor
E. Hall Covel

UNITED STATES PATENT OFFICE.

E. HALL COVEL, OF BROOKLYN, NEW YORK.

IMPROVEMENT IN APPARATUS FOR CHARGING AIR OR GAS WITH HYDROCARBON VAPORS.

Specification forming part of Letters Patent No. 24,199, dated May 31, 1859; extended seven years; reissue No. 5,465, dated June 24, 1873; application filed June 20, 1873.

*To all whom it may concern:*

Be it known that I, E. HALL COVEL, of the city of Brooklyn, county of Kings and State of New York, made an invention of a new and useful apparatus for charging air or gas under pressure with the vapor of hydrocarbons for tempering the quality, and for regulating the delivery of the mixed gas for the purposes of illumination; and I hereby declare that the following is a full, clear, and exact description, and specification of the same, referring to the annexed drawings.

The object of my invention is to produce a mixed gas of a high illuminating power to so temper its quality, and regulate its delivery, that a uniform and steady light may be obtained; and to this end my invention consists in a new surface-vaporizing chamber, with certain combinations of the same; and certain combinations of a regulator, with other mechanism, reservoirs, pipes, and valves, specifically set forth at the end of this schedule, by means of which I am enabled to pass air or gas under pressure over such an extent of the surface of liquid hydrocarbons at rest that the air or gas may be charged with the lightest portion of the liquid without agitation, and to thoroughly mix, temper the quality, and regulate the supply of the commingled gas, with such uniformity and certainty as to adapt it to general use for illuminating purposes.

In order that persons skilled in the art may understand, make, and use my invention, I will proceed to describe it, and the manner in which I have applied it; but it is obvious that many different forms and positions may be adopted for embodying the substance of it without departing from its general characteristics.

Figure 1:
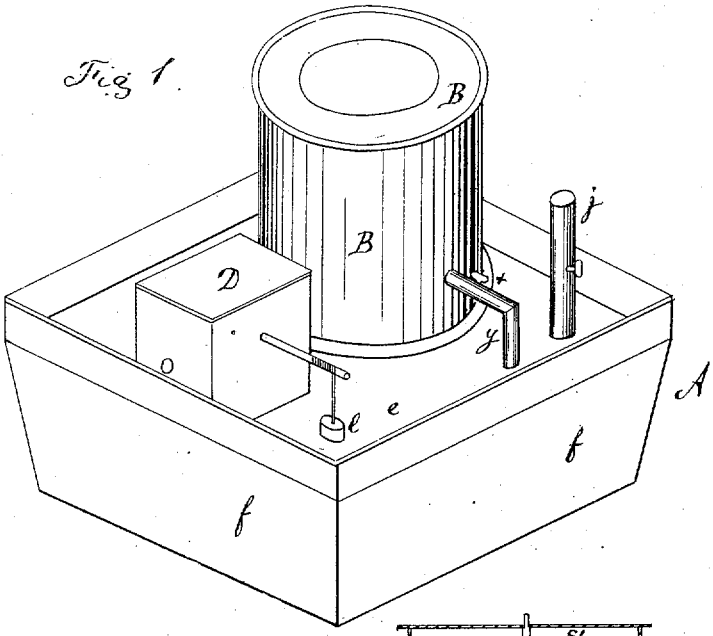
Figure 2:
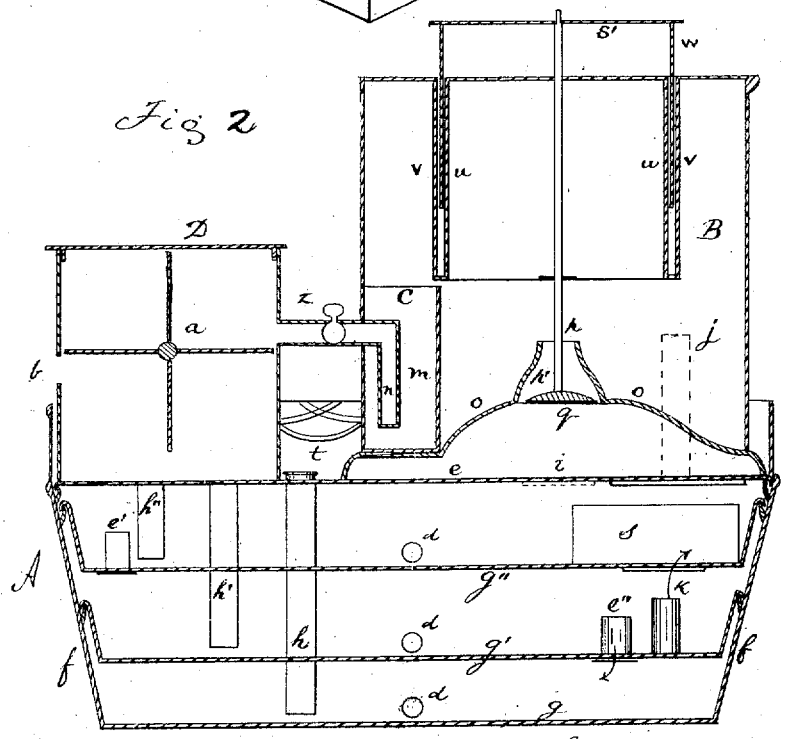

Figure 1 is a perspective view of my apparatus. Fig. 2 is a vertical section through the same.

A represents the vaporizing-chamber, *f f* the sides of the same, and *e* the top, and *g* the bottom. It is made gas or air tight, and is supplied with a liquid hydrocarbon through the tube *h*, reaching nearly to the bottom and into the liquid. When charged, the upper end is closed in any convenient manner. This vaporizing-chamber is provided with a circular opening, *i*, in the top for the admission of air or gas to be charged, which is covered with a perforated plate, and an exit-pipe, *j*, for discharging the mixed gas for the purpose of distributing it to the burners.

In order to increase the evaporating surfaces, I add, when desirable, additional pans, *g′ g″*, and provide tube *h′ h″* for each, arranged in reference to the pans. As the tube *h* is for the bottom surface they each have induction pipes *e′ e″* for the downward passage of air or gas, to be charged, and eduction-openings *k* for the passage of the mixed gas upward to the discharge-pipe *j*. Each pan is supplied with liquid hydrocarbon, (which is prevented from filling the pans by the overflow-pipes *e′ e″*,) thus adding much more surface of the liquid than would be the case if only spread over the bottom of the chamber. I also provide a commingling-chamber, *s*, under the discharge-pipe *j*, and introduce into it one end of a pipe, *y*, leading from the reservoir B for the purpose of tempering the quality of the mixed gas as it passes to the discharge-pipe. In the pipe is a cock, which can be adjusted, and the admission of air or gas into the commingling-chamber regulated. The reservoir B is connected with the vaporizing-chamber by means of pipes or channels, and is, in this instance, above the said chamber. The bottom of the reservoir O is furnished with a passage, *p*, a valve-seat, *p′*, and a valve, *q*, directly over the inlet *i*, in the top of the vaporizing-chamber. Through this passage and over this valve passes the air or gas to be charged. The valve *q* is attached by means of its valve-stem to the top of an inverted cylinder, *s′*, similar to that used for gasometers; and the vertical sides of the cylinder are immersed in water or other suitable fluid held between two other cylinders, *v* and *u*, one inside and the other outside, as shown. The pressure of the air or gas contained in the reservoir acts upon the under side of the cylinder *s′* through the cylinder *u*, and tends to raise it and close the opening *p* by the valve *q*, the amount of opening past the valve being dependent on the position of the valve in the opening *p*. In the reservoir B is an inclosure, C, partly filled with water, or other suitable fluid, to act as a valve over the end of the vertical pipe *n*, leading toward the supply-chamber B. Through this pipe all the air or gas to be charged passes in its way to the vaporizing-chamber A. It is furnished with a cock, *z*, to regulate the quantity or pressure of the air or gas forced into said chamber to be charged.

In addition to the channel *p*, in the bottom of the reservoir, I connect the pipe *y*, before referred to, with the side of it, for the purpose of admitting more air or gas, unmixed, into the commingling-chamber *s* to adulterate the charged or mixed gas as it passes to the discharge-opening *j*, thus tempering its quality, or, in other words, its richness in carbon, the amount admitted being regulated by the cock *x*.

The box D contains a propeller-wheel immersed in water and mounted on a shaft, which has bearings in the sides of the box, and is urged to revolve continuously by a weight, *l*, or other suitable mechanism or power. The air or gas enters the box at *b* and is forced toward the vaporizing-chamber through the pipe *u*, regulated by the cock *z* and water-valve over the end of the pipe in the inclosure *c*.

I have adopted this means for propelling the air or gas to be charged into the vaporizing-chamber, but any means by which the air or gas is forced toward the vaporizing-chamber will answer the purpose, the principal object being to present the air or gas to the surface of the liquid hydrocarbon in a compressed or condensed form to effect a greater amount of evaporation in the same time than would be the case if gas or air were passed over the fluid at atmospheric pressure only.

I sometimes heat the air or gas as it passes from the forcing apparatus into the reservoir, and for this purpose I have provided a lamp, *t*, the flame from which striking against the bottom of the pipe *n* warms it and the passing air.

The tubes *h*, *h'*, and *h''* are intended to reach down into the liquid hydrocarbon, and to be sealed by the liquid. The tubes *e e'* are covered at the bottom by perforated disks, as the opening *i* is shown to be, and for the same purpose. There is a small opening at *u* in the cylinder *s'* to provide for the escape of any dangerous pressure of air in the reservoir. Leading horizontally from each pan are short pipes *d d d* for the purpose of cleaning the pans, drawing off the heavy fluid, and at any time that may be desirable, as the amount of fluid evaporated may vary in the different pans in the same time.

The operation is as follows: The vaporizing-chamber A is supplied with a liquid hydrocarbon by pouring it in the tube *h*, which covers the bottom of the chamber *g*, or through the tubes *h' h''* into the pans *g g''*, until their surfaces are covered and the liquid rises to overflow either of the short pipes *e'* or *e''*, and thence falls into the lower part of the chamber and spreads over the bottom *g'*. After closing the upper ends of the tubes *h h' h''*, the cock *z* is opened and the air or gas is forced through the pipe *n* by the revolution of the propeller *a*, or by any other propelling force. The inclosure *c* being partially filled with water, and above the end of the pipe *u*, it is forced away enough to allow the air to enter the reservoir B through the water *m*. The cylinder *s'* is forced upward by the pressure of the air or gas on its head *s'* and carries with it the valve *q*, partially closing the opening *p* through which the air or gas passes into the vaporizing-chamber A. When the air or gas enters the vaporizing-chamber it passes over the surface of the pan *g'* in a horizontal direction towards the overflow-pipe *e*; thence over the surface of the liquid in the pan *g'*; also in a horizontal direction through the overflow-pipe *e''*; thence in a horizontal direction to the pipe K; whence it passes upward into the commingling-chamber S; is mixed with air or gas introduced into the commingling-chamber through the pipe *y*, and is then delivered into the pipe *j* to be distributed into the burners. As the air or gas is forced over the surfaces of the liquid hydrocarbon it is charged with the vapor of the same, and is carbonized without any agitation of the liquid hydrocarbon. As the cylinder or regulator *s'* is raised by the pressure of the air or gas, whatever excess of pressure per square inch is thrown on its head, *s'*, more than enough to balance its own weight and the weight of its attachments will tend to cause it to rise; at the same time any reduction of pressure will tend to cause it to descend; in the first instance reducing the area of opening around the valve *q*, and, in the latter, increasing said opening so that it regulates the supply of air or gas to the vaporizing-chamber, and, consequently, to the burners. When such pressure becomes excessive, or the delivery entirely stopped, the valve *q* will close, shutting off the supply of air.

If the valve *q* be dispensed with, and the regulator acts only by the inequality of the pressure of the entering air or gas, and the variations in the delivery-pipes, such inequalities and variations will be immediately adjusted by the regulator, and by keeping the pressure uniform, prevent all flickering of the lights. This is a very important feature of my invention.

It will be observed that the whole amount of liquid hydrocarbon is divided up into three portions, so that the air or gas is brought by pressure into direct contact with said subdivided portions, and consequently effects a more certain and uniform mixture of the air or gas and the vapor of the hydrocarbon than could be done by passing it simply over a single surface, with greater depth of the fluid. By my apparatus the lightest portion of the liquid is exposed to the pressure of the air or gas only, and the heavy portion is left to be removed at pleasure from the pipes *d d d*, from each pan separately. It is also an important feature of my invention that either pan may be charged with liquid, without disturbing any of the others, by the tubes *h h′ h″*.

Having now fully described my invention, and the manner in which I applied it, what I claim, and desire to secure by Letters Patent, is—

1. The combination of a chamber for vaporizing hydrocarbon, provided with a pan or pans, or other surfaces, in substantially a horizontal position, and arranged in the manner described, so that a free current of air or gas may be forced in a horizontal direction over the surface of the liquid hydrocarbon contained therein at rest, with a forcing apparatus, and inlet and outlet cocks or valves for the admission of the air or gas to be charged and the delivery of the mixed gas, substantially as herein set forth.

2. The combination of a chamber for vaporizing hydrocarbon, in which the liquid is held at rest on horizontal surfaces, arranged in the manner described, so that the air or gas is forced to pass horizontally over them, with an apparatus for forcing said air or gas over said surfaces, substantially as herein set forth.

3. The combination of a chamber for vaporizing hydrocarbons, an apparatus for forcing air or gas into said chamber, and a self-regulating device for equalizing, checking, or controlling the pressure, substantially as set forth.

4. The combination of a self-regulating apparatus and a vaporizing chamber, substantially as herein set forth.

5. The combination of a gas or air forcing apparatus, a reservoir, and a self-regulating device, substantially as herein set forth.

6. The combination of a chamber for vaporizing hydrocarbons, a reservoir provided with a self-adjusting device for regulating the pressure of the mixed gas, and a commingling-chamber, substantially as herein set forth.

7. The combination of a vaporizing chamber, a reservoir, and a self-regulating device and valve, substantially as herein set forth.

8. The combination of a commingling-chamber, self-regulating device, and outlet-cock, *j*, for the purposes substantially as herein set forth.

9. The combination of the reservoir-pipe for admitting air or gas to it, and an adjustable cock or fluid valve for regulating the quantity and flow of the air, substantially as herein set forth.

10. The combination of the vaporizing-chamber, the reservoir, forcing-apparatus, regulating-device and valve, and inlet and outlet pipes, substantially as herein set forth.

11. The combination of a chamber for vaporizing hydrocarbons, with partitions or channels for extending the surface and reducing the depth of the liquid, with a regulating device, arranged in the manner described, so that a current of air, under regulated and controlled pressure, may pass over said extended surface, and every portion of it, substantially as set forth.

12. The combination and arrangement of pipes for feeding the liquid hydrocarbon to the pans, and drawing off the heavy unvaporized liquid, whenever desired, from each pan or division separately, substantially as herein set forth.

The above specification of my said invention signed and witnessed at Washington city this 20th day of June, A. D. 1873.

E. HALL COVEL.

Witnesses:
C. M. PARKS,
H. L. PERRINE.